United States Patent [19]

Garza

[11] 4,379,715
[45] Apr. 12, 1983

[54] GOB DISTRIBUTOR FOR GLASS OR OTHER MATERIAL

[75] Inventor: Elio M. Garza, Monterrey, Mexico

[73] Assignee: Investigacion Fic Fideicomiso, Monterrey, Mexico

[21] Appl. No.: 297,309

[22] Filed: Aug. 28, 1981

[30] Foreign Application Priority Data

Oct. 31, 1980 [MX] Mexico .................................. 184566

[51] Int. Cl.³ .............................................. C03B 5/30
[52] U.S. Cl. ........................................ 65/225; 65/304
[58] Field of Search ................................. 65/225, 304

[56] References Cited

U.S. PATENT DOCUMENTS

Re. 28,759  4/1976  Bystrianyk et al. .............. 65/225 X
3,775,083  11/1973  Nebelung et al. ................ 65/304 X Primary Examiner—Arthur D. Kellogg
Attorney, Agent, or Firm—Abelman, Frayne & Rezac

[57] ABSTRACT

A gob distributor for glass-working machines in which the scoops are indexed angularly in unison by paired racks which provide the sole support and positioning members for the scoops.

10 Claims, 5 Drawing Figures

GOB DISTRIBUTOR FOR GLASS OR OTHER MATERIAL

FIELD OF THE INVENTION

The present invention refers to a gob distributor for machines for the shaping of articles of glass or other materials which effectively and efficiently regulates the various movements of the distributor scoops towards respective shaping stations, which is of reduced size and easy to construct as compared with the known distributors, which can operate at higher speed of production by increasing the distance of fall of the gob between the feeder bowl and the scoops.

BACKGROUND OF THE INVENTION

In the manufacture of articles of glass or other materials molten glass is supplied in a continuous stream from a feeder bowl and is continuously cut by suitable cutters into portions known as gobs, which are distributed, by a gob distributor, to one or more cavities of a plurality of article-shaping stations, generally eight, which constitute the machine.

Gob distributors for distributing the gobs to the shaping sections of the machine for the manufacture of articles of glass are well known and have achieved very effective development during the last few years, so that this type of mechanism has become an extremely efficient unit which makes possible the formation of articles of glass in multiple-station machines, which has increased the production capacity to a great extent.

For example, U.S. Pat. No. 3,597,187 of Aug. 3, 1971, to Urban P. Trudeau assigned to Owens Illinois Inc. describes a molten glass gob distributor which comprises a pair of curved movable scoops supported on vertical shafts which by means of suitable gears are caused to turn through a predetermined angle of turn by a transverse bar which contains a cam follower which is pressed against the control cam, which has a shape such that it causes the curved scoops to turn simultaneously between one molding station and the next. The control cam in its turn is turned by means of a ring gear and a worm which is coupled to the shaft which is turned by a synchronous motor which turns the cam at a constant speed in synchronism with the operation controls, for instance the time drum which controls the various operations of each station of a multi-station machine for the shaping of glass articles.

In U.S. Pat. No. 3,721,544 of Mar. 20, 1973, to Wasyl Bystrianyk and Francis A. Sarkozy, assigned to Emhart Corporation, there is also described a distributor for gobs of molten glass which comprises essentially a pair of rotatable curved scoops, a mechanism for supporting the curved scoops in dependent relationship side by side in order to turn them on each of their vertical axes, which mechanism includes a ring spur gear adjacent to the upper end of each scoop, a horizontally extending slideable member supported in a housing which supports the mechanism and which at one end has a portion which defines a rack for coupling with the spur gears on the scoops in order to turn them and at its other end a cam follower which is compelled by a spring to follow the path of a rotating multilobe cam, each of the lobes having a predetermined lift which results in a reciprocating movement which defines the position at which the curved scoops turn.

This type of distributor has a cooling system for each scoop, consisting of a cooling passage of spiral configuration provided in a funnel-shaped portion.

The cooling liquid generally employed is water and it is introduced through an entrance gate and into an annular passage through a neck in which the ring gear is defined within the profiled spiral groove in the inner portion of the tubular funnel and from there upward and downward within an aligned passage defining the scoop portion, having a similar return portion with reference to the other scoop and funnel.

Finally, U.S. Pat. No. 3,775,083 of Nov. 27, 1973, to Nebelung et al., assigned to Emhart Corporation, describes and claims a gob distributor for machines for the forming of articles of glass which differs with regard to the manner of controlling the movement of the ring gears which in their turn move the shafts connected to the movable scoops since, in the particular case of the patent to Nebelung et al., such shafts are movable by means of ring gears which are connected to different racks, each of which is actuated by a fluid-driven linear motor, each one of which has a plurality of pistons which are driven through suitable distances and held by means of suitable stops in such a manner that a sequential movement can be imparted to each of the fluid-operated motors in order to enable the mechanism to move the scoops of the distributor between one station and the following one marked in the sequence by mere fluid pulses or signals instead of the use of the traditional cams which are employed both by Trudeau and by Bistrianyk. Nebelung, et al., however, use a plurality of individual pistons placed in tandem within respective pneumatic cylinders, which pistons are moved individually by air signals which come from each of the individual sections of the machine in order to move the distribution scoops in suitable sequence.

In this distribution system, the cooling of each distributor scoop is constituted by the walls in the portions of the funnels, which have cooling passages arranged in a spiral through which the cooling water is directed. The cooling fluid protects the support of the frame of the gearing, conducted from the outside and directed via the upper portion of a groove through the profile of each spiral scoop and from there to a cooling passage within the scoops, the manufacture of this type of distributor being rather complicated.

The problems which have been caused by the use of cooling passages for each scoop in the distribution of gobs of the different machines for the shaping of glass articles are known and reside essentially in the cooling of the bushings of the distributor scoops by means of a system of internal conduits of spiral configuration within the frame through which the cooling fluid is directed, its manufacture being more complicated and the size of the distributor being increased.

Another substantial disadvantage present resides in the fact that the present distribution units, because they are of larger size, occupy a greater amount of space between the feeder bowl which contains the molten glass and the different scoops of the shaping stations, thus preventing operation at higher speeds by shortening the distance of fall of the gob.

Another substantial disadvantage of the present distributors is that their manufacture is more complicated and their cost of manufacture greater.

SUMMARY OF THE INVENTION

A main object of the present invention is to provide a gob distributor for machines for the shaping of articles of glass or other materials which eliminates the liquid cooling system of the known distribution mechanism, replacing it with a cooling system which is less complicated.

Another object of the present invenion is to provide a gob distributor which does not require water-cooled bronze bushings.

Still another object of the present invention is, by reducing the space between the dosing source and the different channels of the shaping stations, to make it possible to work at higher speeds by increasing the height of fall of the gob.

Still another object of the present invention is that the size of the distributor is reduced to half that of the present distributors, its construction being less complicated.

A further object of the present invention is to provide a gob distributor which is of very great efficiency and precision and of lower competitive cost.

The above objects and others related thereto are obtained preferably, in accordance with the present invention, by providing a gob distributor for machines for the shaping of articles of glass which comprises in combination: a support housing or frame; fastening means rigidly coupled to the upper end of each curved distributor scoop; a drive member and an auxiliary member which firmly and turnably hold the curved distributing scoops between them by fastening means in dependent linear relationship; linking means which turn on a central shaft fastened to the housing or support frame which holds the distributor scoops aligned closely together side by side and which, through their fastening means, link and transmit the movement of the drive member inversely to the auxiliary member which acts as support, so as to permit the simultaneous synchronized turning of all the scoops; and a positioner coupled to the drive member in order to impart movements of advance and retraction to it so as to move the curved scoops simultaneously through an angle to selective positions of delivery in a programmed sequence, with precise movements between the different sections of the shaping machine.

BRIEF DESCRIPTION OF THE DRAWINGS

The novel features which are considered characteristic of the present invention will be set forth in detail in the accompanying claims. However, the invention itself, both on basis of its organization and its method of operation, together with additional objects and advantages thereof, will be better understood from the following description, read in conjunction with the accompanying drawings, in which:

DETAILED DESCRIPTION

Figure 1:
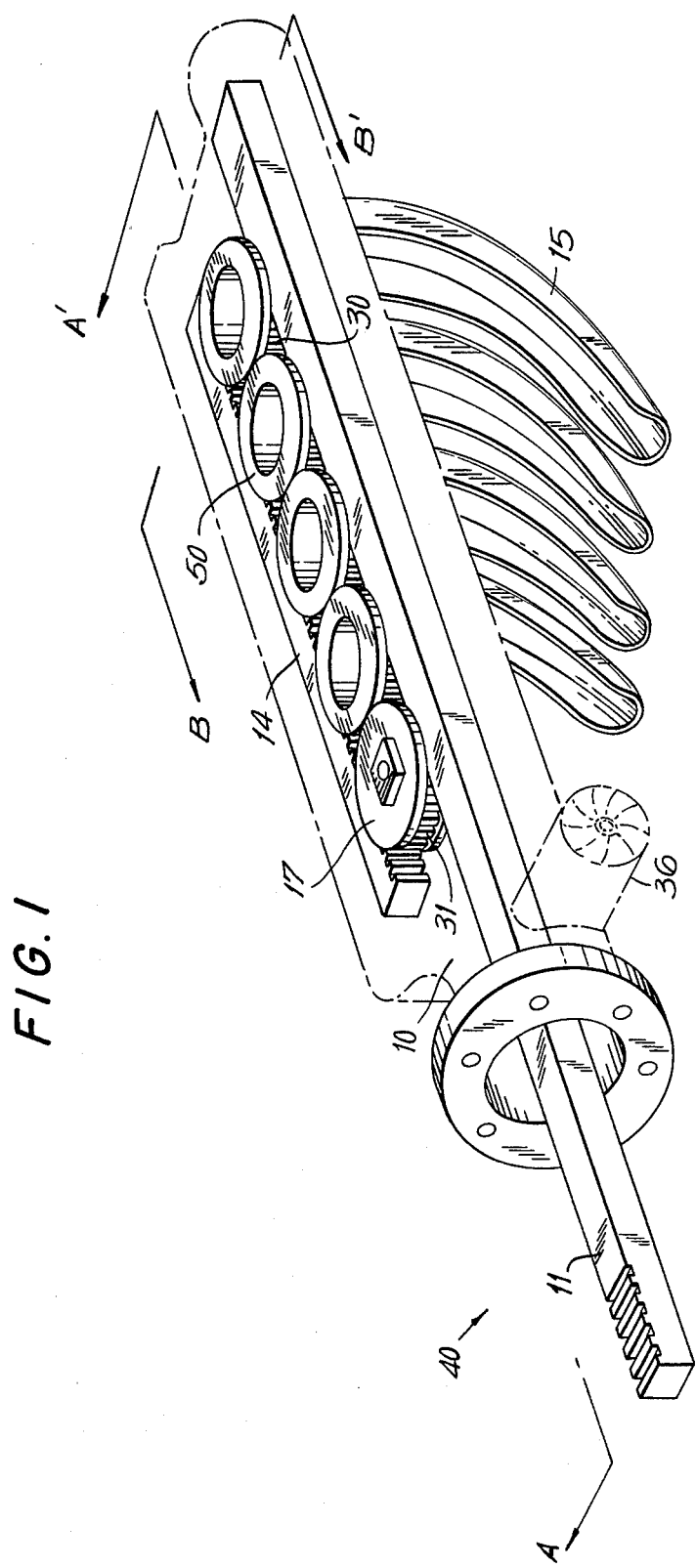
FIG. 1 is a perspective view of the gob distributor of the present invention, showing a first arrangement for coupling with a positioner.

FIG. 1 shows the distributor 40 of the present invention which comprises essentially a support frame or housing 10 having four distributing scoops 15 arranged in tandem and each one having a gob receiver receiving gobs from a feeder bowl (not shown) in order to distribute them to the different forming sections (not shown) of the machine for the molding of glass articles. This set of scoops 15 is moved in synchronism by a drive rack 11 which is coupled to a positioner (not shown) in order to impart movement in a given synchronized sequence, in combination with an auxiliary rack 14.

Figure 2:
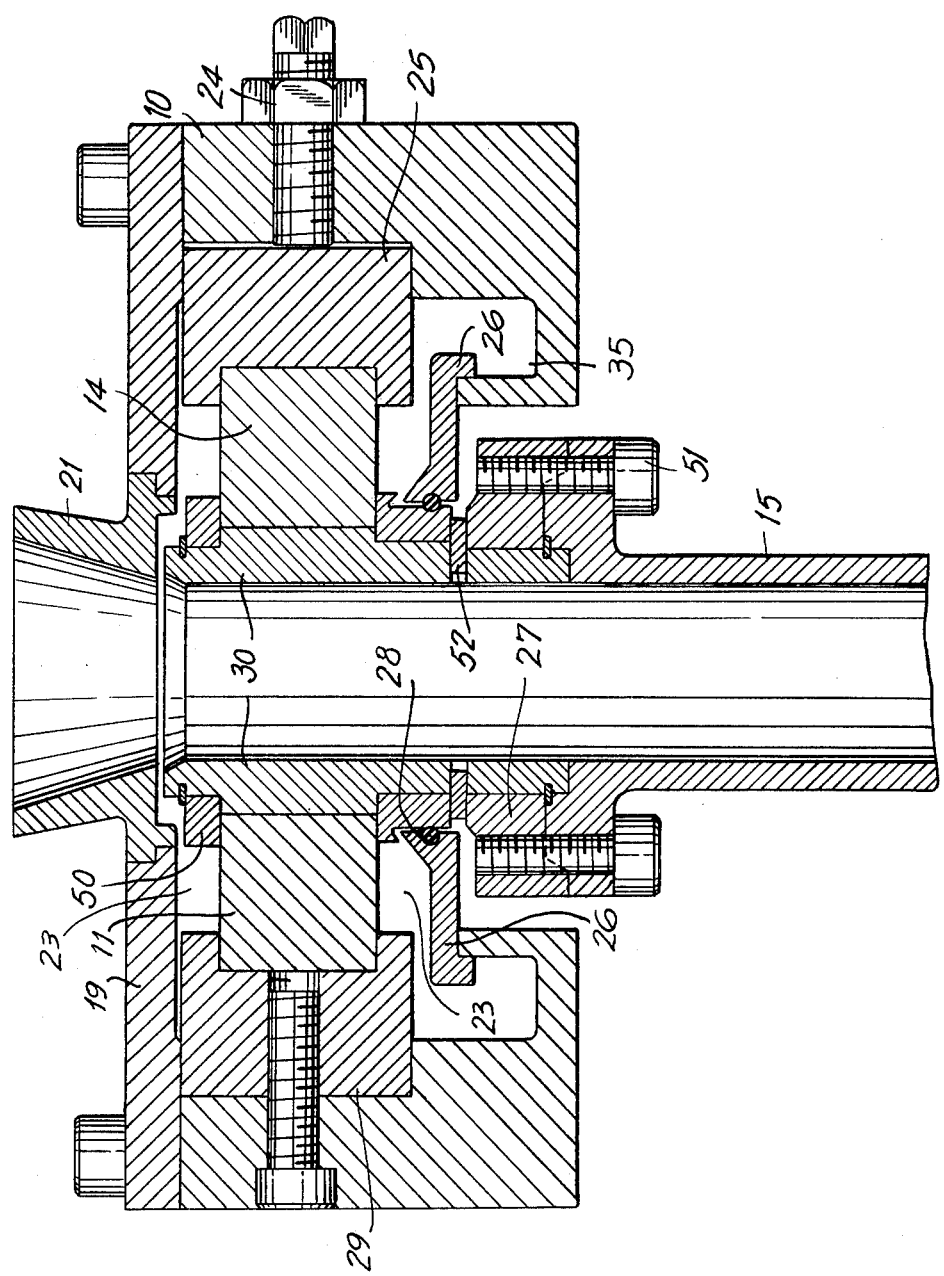
FIG. 2 shows the inner rack-gear coupling along the section B—B' of FIG. 1.

Referring now to FIG. 2, a view along the section line B—B' of FIG. 1, there is seen a distributing scoop 15 which has coupled to it a ring gear 30 integrated with the upper part of the distributor scoop 15; this ring gear 30 is held firmly between an upper plate or flange 50 and a lower one 27; each scoop 15 is coupled between a pair of toothed racks 11 and 14; the toothed rack 11 is a drive rack which transmits its movement by means of the positioner (not shown) via the gear 30 to the auxiliary toothed rack 14 in order to move the scoops 15 in synchronism to the respective shaping sections (not shown). The drive rack 11 is supported by the frame 10 by means of a guide 29 which is fastened to the structure of the frame 10 and which makes it possible for the drive rack 11 to slide longitudinally. The auxiliary rack 14 also has a guide 25, not fixed, which makes it possible to adjust the play present between the two racks 11 and 14 and gears 30 due to the wear which they suffer, due to the constant movement, in the course of time. The guide 25 is adjusted by means of a compensating screw 24 for each scoop 15 and is supported by the frame 10.

The gears 30 are intercoupled to each scoop 15 by a lower plate or flange 27 which permits correct assembly between each gear 30 and scoop 15 and, as a result, upon the transmission of the movement via the drive rack 11, permits each scoop 15 to distribute in proper and orderly manner the gobs or batches of molten glass to the different forming sections of the machine. This connection between the ring gear 30 and the scoop 15 is effected via the fastening means 51 and 52.

In the lower part of the gear 30, located at the height of the plate 27 which connects the scoop 15 and the gear 30, there is a pan-shaped part 26 which makes it possible to recover the oil by gravity in a tank 35 and to be able to recirculate this oil for the lubrication of the inner mechanism of the distributor 40 and furthermore prevent its leaking out, for which there is furthermore interposed an oil seal ring 28 between the lower plate or flange 27 and the gear portion 30.

With respect to the upper part of the distributor 40 there is a cover 19 which bears, connected to it, a fixed funnel portion 21 for each distributor scoop 15, which avoids the diverting of the gob out of the distributor.

Figure 3:
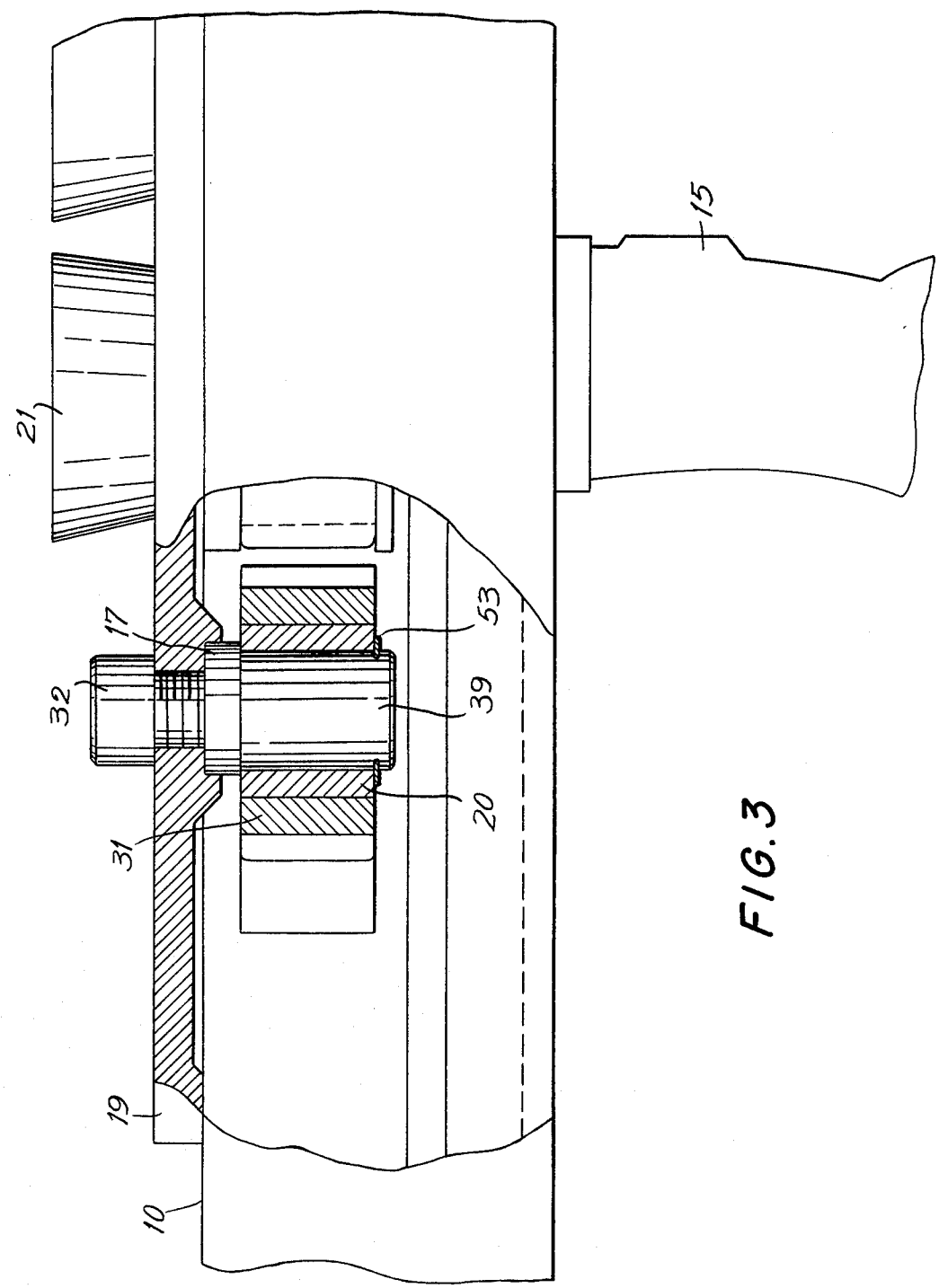
FIG. 3 shows the inner mechanism along a section A—A' through the distributor shown in FIG. 1.

FIG. 3 shows a view along the section A—A' of FIG. 1 at least one gear 31, which may be coupled directly or indirectly to the frame 10 and the function of which is to impart synchronism to the auxiliary rack 14, providing support and movement to the gears 30 which, coupled with the scoops 15, comply with the movement of the drive rack 11, moving at the same time from one position to the other. This gear 31 is supported on the cover 19 of the distributor 40 by an inner bushing 20 which is rotatable on a pin 39 which is supported by separate fastening means 32, 53 on a plate 17. Through this gear 31, the drive rack 11 and the auxiliary rack 14 maintain the gears 30 aligned side by side and the movement of the drive rack 11 is transmitted to the auxiliary rack 14 to permit the synchronized turning of all the gears of the scoops.

The fastener 32 extends above the cover 19 of the distributor 40, said cover having a slot (not shown) which permits the sliding of the aforementioned gear 31 laterally of the cover when there is an adjustment between racks 11 and 14, by means of the guide 25 and screw 24, which are shown in FIG. 2.

Figure 4:
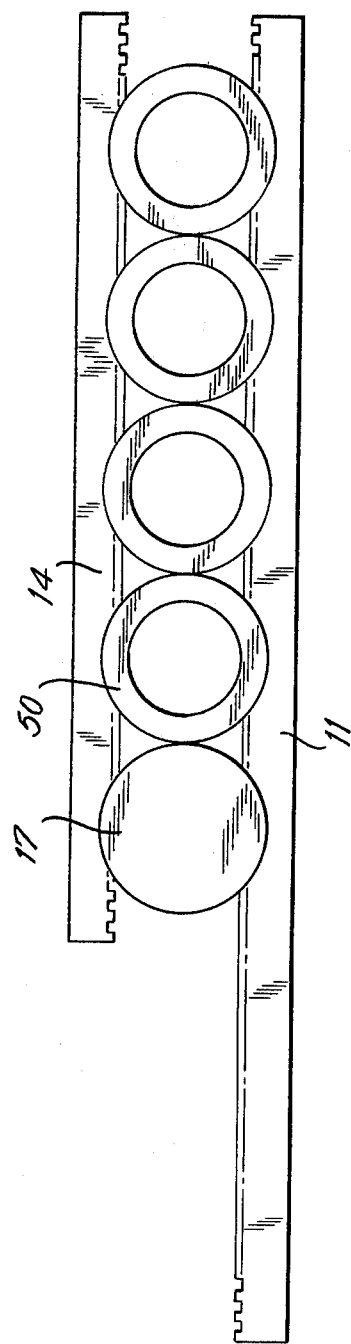
FIG. 4 is a top plan view of the distributor shown in FIG. 1.

FIG. 4 shows a plan view of the distributor 40 in which there can be seen the coupling present between the drive rack 11, the gears with their projecting plates 17 and 50 and the auxiliary rack 14.

Figure 5:
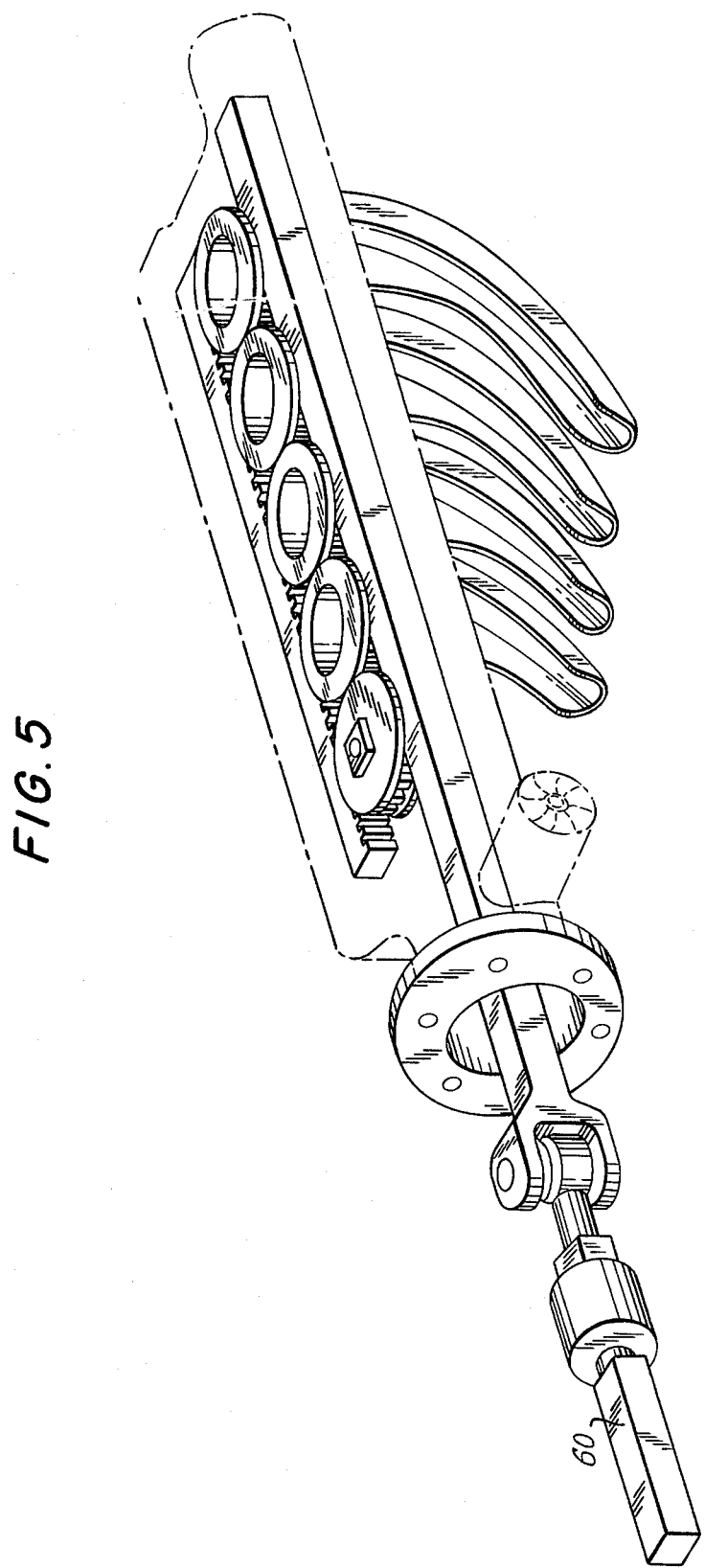
FIG. 5 is a convention perspective view of another embodiment of the present invention, showing a second arrangement for coupling with a positioner.

Referring now to FIG. 1, coupling directly or indirectly to the frame 10 is an air cooling system 36 which makes it possible to cool the inner mechanism of the distributor 40 through the internal passages 23 shown in FIG. 2. This cooling by air will prevent the overheating of the gears 30 and both racks 11 and 14. Referring in particular to FIG. 5, there is shown therein another arrangement of the distributor 40 for coupling with a positioner of the fork type (not shown) which includes a connecting rod 60 articulately coupled at one of its ends to the drive rack 11.

As is well known in the art, the stream of molten glass issuing from the feeder bowl which is continuously cut into portions known as gobs, which are then distributed to the different forming sections (not shown) by means of the scoops 15 which move in synchronism from one position to the next via the drive rack 11 and the auxiliary rack 14 and which in a given sequence feed the gobs to the different sections of the machine for the shaping of glass articles.

It will be understood that the invention is not limited to the embodiment set forth above and that those skilled in the art will be able, based on the teaching of the present invention, to make changes in the design and distribution of the component parts of the invention which fall clearly within the true spirit and scope of the invention which is claimed in the following claims.

I claim:

1. In a glass gob distributor of the type including plural curved distributing scoops, each supported within a housing for rotational movement about a vertical axis, a pinion carried by each said scoop, and dual racks each meshed with each said pinion at diametrically opposite sides thereof, said drive racks simultaneously angularly indexing said scoops upon longitudinal movement of said racks relatively to each other, the improvement comprising:
    a further pinion independent of said scoop pinions, supported by said housing and interposed between and meshed with both said racks, said further pinion translating movement of one said rack into an equal and opposite movement of the other said rack;
    means supporting said further pinion for movement towards one of said racks;
    adjustable guide means supporting the other of said racks and movable towards the said one rack to move said other rack and said other pinion towards said one rack to eliminate clearance between the teeth of the respective and said further pinion; and,
    members supporting each said scoop on an upper face of both said racks, said scoops extending downwardly with clearance through apertures in a bottom wall of said housing, said racks providing the sole support and positioning members for said scoops.

2. A gob distributor for machines for the shaping of articles of glass and other materials in accordance with claim 1 in which the fastening means is at least one ring gear held between an upper annular plate or flange and a lower one.

3. A gob distributor for machines for the shaping of articles of glass and other materials according to claim 1 in which the drive member is a drive rack.

4. A gob distributor for machines for the shaping of articles of glass and other materials according to claim 1 in which the auxiliary member is an auxiliary rack.

5. A gob distributor for machines for the shaping of articles of glass and other materials according to claim 1 in which the connecting means is at least one support gear held between an upper plate or flange and a lower one which turns on a respective central shaft fastened to the housing or frame at each end of the drive and auxiliary members.

6. A gob distributor for machines for the shaping of articles of glass and other materials according to claim 1 in which the positioner is of the rack and pinion type, the rack of which is coupled directly to the drive member.

7. A gob distributor for machines for the shaping or articles of glass or other materials according to claim 1 in which the positioner is of the fork type which imparts the movement of advance and retraction to the connecting rod and to the drive member.

8. A gob distributor for machines for the shaping of articles of glass or other materials according to claim 1 in which the housing or frame has integrated with it a funnel portion for each distributor scoop in order to prevent the gobs which go to the different forming sections of the machine from being diverted.

9. A gob distributor for machines for the shaping of articles of glass or other materials according to claims 1 in which the support housing or frame has a lubrication and cooling system coupled to it, directly or indirectly.

10. The glass gob distributor of claim 1, in which said housing has closed top, bottom and side walls defining an elongate channel through which said distributing scoops extend in substantially sealed relationship, and an air blower is associated with said housing and is operative to force a flow of cooling air into and through said elongate channel from one end thereof, said drive racks and pinions each being directly exposed to said flow of cooling air through said elongate channel.

* * * * *